Dec. 22, 1959 G. V. NOLDE ET AL 2,918,656

INFORMATION STORAGE APPARATUS

Filed June 7, 1957 11 Sheets-Sheet 1

INVENTORS
GEORGE V. NOLDE &
JOSEPH A. BRUSTMAN

BY Morris A. Rabkin
ATTORNEY

Dec. 22, 1959 G. V. NOLDE ET AL 2,918,656

INFORMATION STORAGE APPARATUS

Filed June 7, 1957 11 Sheets-Sheet 2

INVENTORS
GEORGE V. NOLDE &
JOSEPH A. BRUSTMAN
BY Morris ... Rabkin
ATTORNEY

INVENTORS
GEORGE V. NOLDE &
JOSEPH A. BRUSTMAN
BY
Morris L. Rabkin
ATTORNEY

INVENTORS
GEORGE V. NOLDE &
JOSEPH A. BRUSTMAN
BY Morris Robbin
ATTORNEY

INVENTORS
GEORGE V. NOLDE &
JOSEPH A. BRUSTMAN
BY Morris A. Rabin
ATTORNEY

Dec. 22, 1959 G. V. NOLDE ET AL 2,918,656

INFORMATION STORAGE APPARATUS

Filed June 7, 1957 11 Sheets-Sheet 6

INVENTORS.
GEORGE V. NOLDE &
JOSEPH A. BRUSTMAN

BY Morris A. Rabkin

ATTORNEY.

INVENTORS
GEORGE V. NOLDE &
JOSEPH A. BRUSTMAN
BY Morris Rabkin
ATTORNEY

INVENTORS
GEORGE V. NOLDE &
JOSEPH A. BRUSTMAN
BY Morris Rabkin
ATTORNEY

Dec. 22, 1959 G. V. NOLDE ET AL 2,918,656

INFORMATION STORAGE APPARATUS

Filed June 7, 1957 11 Sheets-Sheet 9

INVENTORS
GEORGE V. NOLDE &
JOSEPH A. BRUSTMAN

BY Morris [signature]
ATTORNEY

INVENTORS
GEORGE V. NOLDE &
JOSEPH A. BRUSTMAN
BY Morris L. Rabkin
ATTORNEY

INVENTORS
GEORGE V. NOLDE &
JOSEPH A. BRUSTMAN
BY Morris L. Rabkin
ATTORNEY

United States Patent Office 2,918,656

Patented Dec. 22, 1959

2,918,656

INFORMATION STORAGE APPARATUS

George V. Nolde, Santa Monica, Calif., and Joseph A. Brustman, Narberth, Pa., assignors to Radio Corporation of America, a corporation of Delaware Application June 7, 1957, Serial No. 664,209

10 Claims. (Cl. 340—173)

The present invention relates to information handling systems, and more particularly to apparatus for storing and retrieving information in a storage system.

In present commercial information handling systems, large volumes of information must be stored and yet be available for use with a computer or other high speed data processing device. Some information may be retained within the internal memory of a computer, but such internal storage is quite costly. At the other extreme, large volumes of information may be stored on magnetic tape reels at low cost, but the retrieval of such information is time consuming.

It is desirable, therefore, to have an external memory which can store volumes of information in the form of individual messages, any one of which may be retrieved in a relatively short time.

Accordingly, it is an object of the present invention to provide an information storage system which has a large capacity and which may retrieve a desired message in a relatively short time.

It is a further object of the invention to provide a large scale information storage containing a plurality of address locations, any one of which may be located directly.

It is a further object of the invention to provide a large scale information store which has direct access to any storage location.

It is a further object of the invention to provide an information storage in which messages are recorded on a magnetized record member and in which any one of a plurality of record members may be quickly located.

It is an additional object of the invention to provide a large scale information store which responds to digital address signals to locate a desired record member, and which positions a transducing unit opposite the record member.

It is a still further object of the invention to provide a large scale information store responsive to digital address signals for accurately positioning and indexing a transducing unit at an addressed record member, and which may withdraw the record member for entry or extraction of information messages and return the record member to the store.

It is a still further object of the invention to provide a large scale rapid access memory system which is quiescent until addressed and which, when addressed by digital information signals, utilizes said signals to direct a transducing unit to a desired addressed record member.

According to a preferred embodiment of the present invention, information is recorded in digital form on a special magnetizable record member. A plurality of record members are stored in various physical locations of a storage file. A transducing unit on a movable carriage responds to digital code signals, accurately positioning the transducing unit opposite a record member at the signaled address location. A buffer storage may be included in the system to serve as an interim storage for messages being transferred between the large scale store and the information handling system.

Information to be stored in the file is transmitted together with a coded address location into the buffer storage. The address signals are applied to the file address circuits. Suitable servo mechanism networks respond to the address signals to position the carriage at the given address. The transducing carriage physically withdraws the record member at the specified address and the contents of the buffer storge may be written on the record member. The record member is replaced in the file and the system awaits a further instruction.

To retrieve a message from the file, the desired address location is transmitted by the information handling system. The transducing carriage seeks the new location and withdraws the record member located thereat. The message contained on the record member is read and held in the buffer storage. At the completion of the message the record member is returned to the file and the information handling system can, upon demand, transfer the contents of the buffer storage into the system.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 3 is a top sectional view of a portion of the assembly of Figure 2 shown with a shuttle at a position for extracting a record card;

Figure 1:
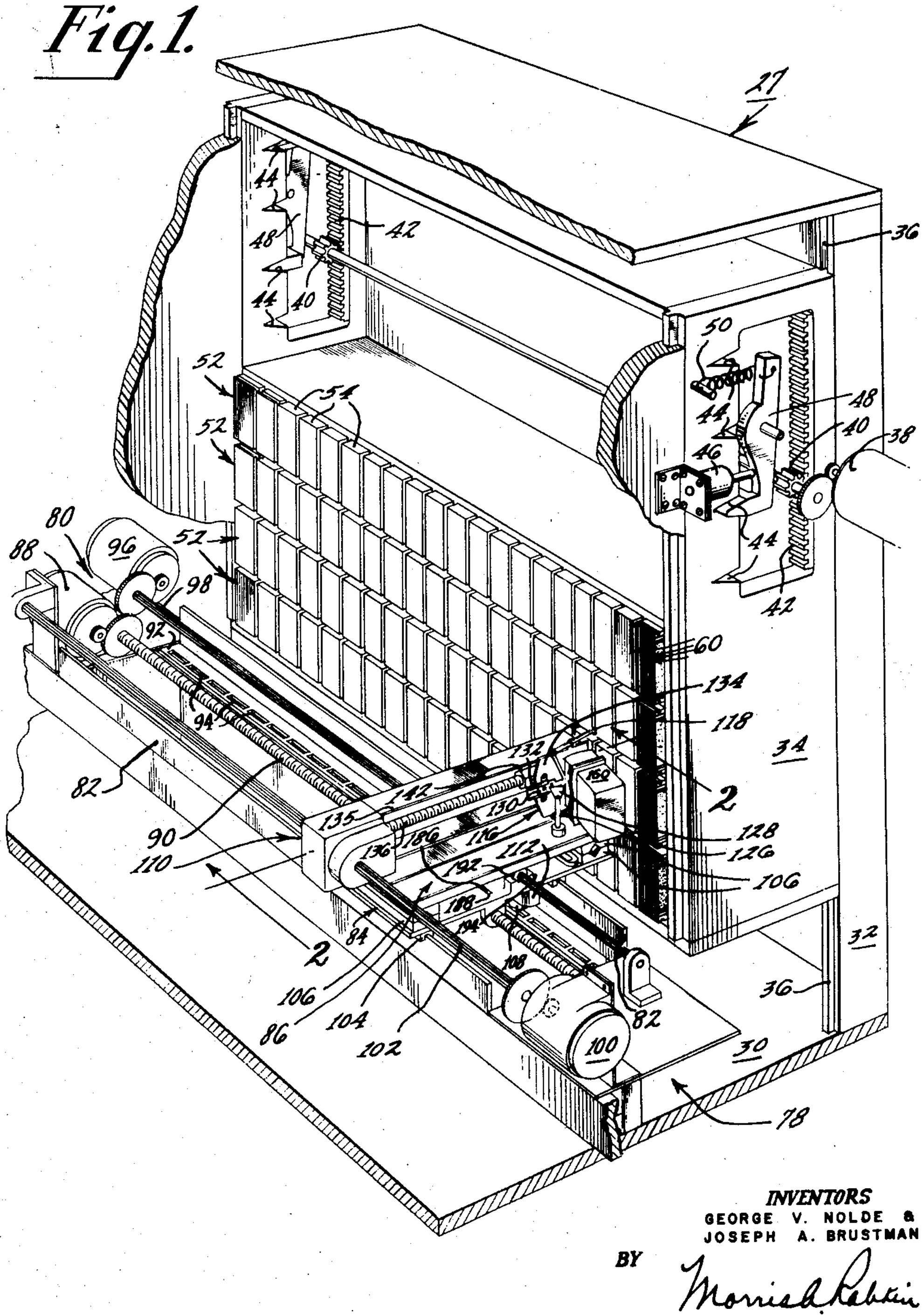
Figure 1 is a perspective view of a rapid access file arrangement according to the present invention.

A rapid access file 27 according to the present invention, as seen in Figure 1 includes a base 30 upon which is mounted a file rack frame 32 and a searching mechanism 78. The searching mechanism 78 includes a traversing assembly 80 and a shuttle assembly 110. The searching mechanism 78 is constrained to move at a fixed height above the base 30 in a plane parallel to the base 30.

A bank carriage assembly 34 is slidably mounted on guide channels 36 within the file rack frame 32. A bank motor 38 attached to the file rack frame 32 moves the bank carriage assembly 34 in a plane perpendicular to the plane of the searching mechanism 78. The bank motor 38 drives a set of bank pinion gears 40 which, in turn, mesh with cooperating bank rack gears 42 to move the bank carriage assembly 34 vertically within the guide channels 36. A set of indexing notches 44 are provided within the bank carriage assembly to align different portions of the bank carriage assembly with the plane of the searching mechanism 78.

A pair of bank locking solenoids 46, attached to the file rack frame 32, are connected to a pair of bank locking dogs 48. Bias spring 50 normally holds the bank locking dogs 48 out of engagement with the bank indexing notches 44. The bank locking solenoids 46, when energized, engage the bank locking dogs 48 with a pair of the bank indexing notches 44 aligning the bank carriage assembly 34 opposite the traversing assembly 80.

The bank carriage assembly 34 houses several (for example 4) horizontal banks 52 of record members or cards 60. Each of the banks 52 is divided into smaller units or card cells 54. In one embodiment, each bank 52 contains twenty cells 54 and each cell 54 may hold twenty-five cards 60. The physical structure of the individual banks 50, cells 54, and cards 60, is set forth in greater detail in connection with Figures 9 and 10 below.

Figure 2:
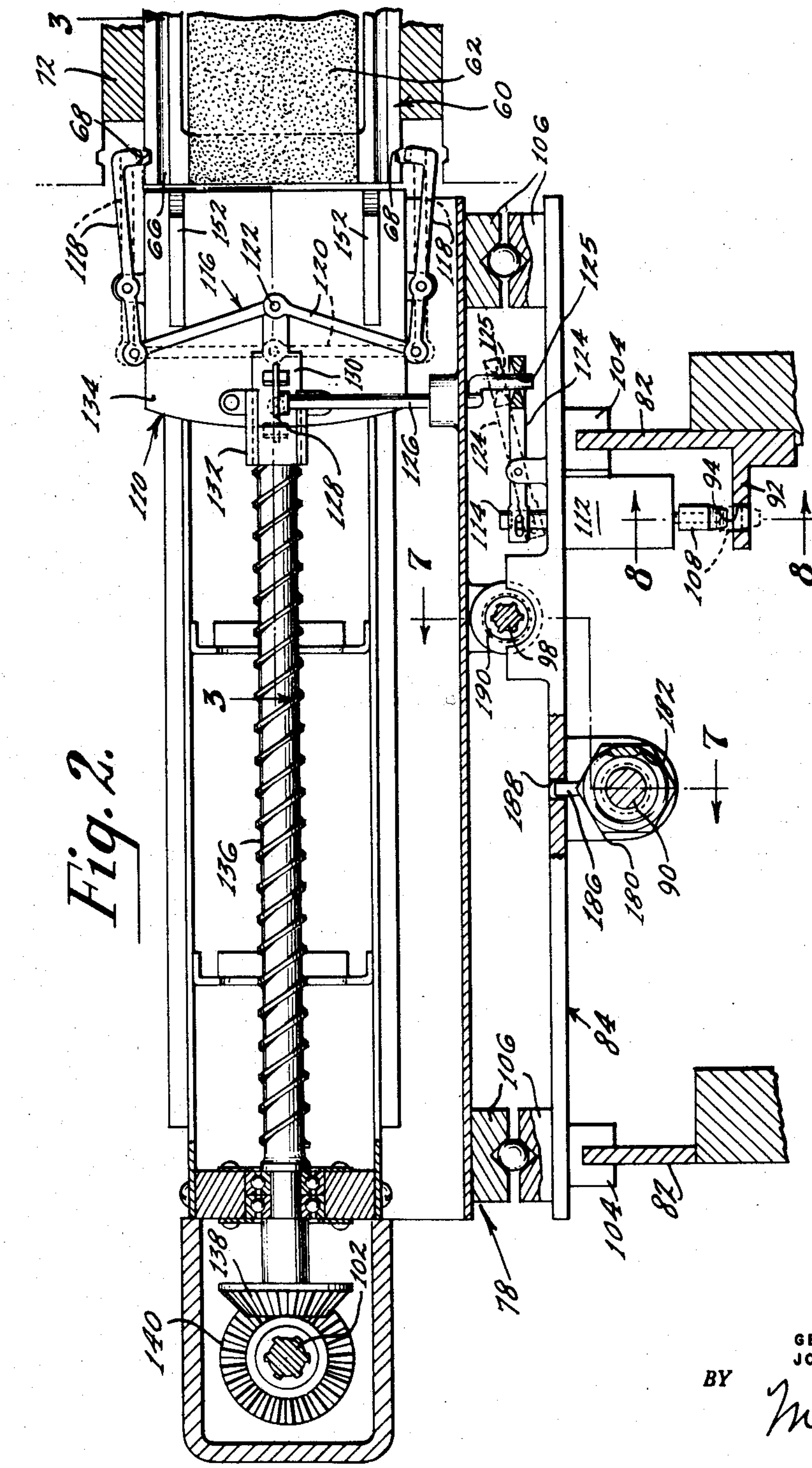
Figure 2 is a transverse sectional view of a portion of a traversing assembly of the arrangement of Figure 1, omitting a magnetic head assembly.

The searching mechanism 78 shown in greater detail in Figure 2 is mounted on a set of guide rails 82 which extend to the base portion 30. The traversing assembly 80 includes a traveling coarse carriage assembly 84 which rides rails 82 and a fine carriage 86. The fine carriage 86 carries a shuttle assembly 110.

A coarse carriage motor 88 drives a cell screw shaft 90 which engages the coarse carriage assembly 84, the description of which is set forth in greater detail in connection with Figure 7 below. A support member 92 containing coarse position indexing notches 94 is affixed to one of the guide rails 82. Each notch 94 is positioned to align the shuttle assembly 110 opposite a different card cell 54.

The fine carriage motor 96 drives a card spline shaft 98 which drives the fine carriage 86 relative to the coarse carriage 84, also shown and described in connection with Figure 13 below. The fine carriage 84 may be positioned opposite any card 60 within a selected cell 54. A shuttle motor 100 drives a shuttle spline shaft 102 which engages the shuttle assembly 110 to provide the traveling shuttle with a source of energy.

The shuttle assembly 110 is mounted on the fine carriage 86 which in turn rides on the coarse carriage 84 by means of coarse carriage guides 104. A pair of fine carriage guides 106 connect the fine carriage 86 to the coarse carriage 84.

A claw and index solenoid 112, mounted on the coarse carriage 84, drives a coarse carriage locking dog 108 into a coarse index notch 94 for positioning the coarse carriage 84 opposite a particular cell 54. A linkage 114, also driven by the claw and index solenoid 112, actuates a claw actuator link 116 to close claws 118.

Figure 6:
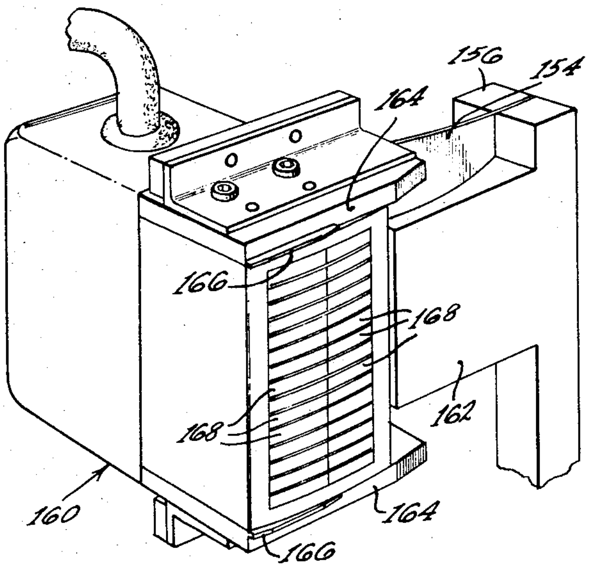
Figure 6 is a perspective view of the magnetic head assembly of Figure 1 and Figure 4.

The claw actuator link 116 is connected to a claw linkage 120 which translates the horizontal motion of a central pivot 122 to vertical motion at the claws 118. The claw assembly 116 is attached to a card shuttle 134. A pair of magnetic head cams 152 are mounted on the card shuttle 134 to hold a magnetic head assembly 160 (not shown) out of the plane of card 60 travel. The magnetic head assembly 160 is omitted in Figure 2, but is shown in detail in Figure 6.

The claws 118 close to engage notches 68 on the individual cards 60. The cards 60, when engaged by the claws 118, move in and out of the card storage areas. The shuttle 134, slidably mounted on shuttle guides 135, is engaged by a threaded shuttle shaft 136 which is carried on the fine carriage 86. The threaded shaft 136 is driven by a bevelled gear 138 which meshes with a mating bevelled gear 140. The driving gear 140 is slidingly mounted on the shuttle spline shaft 102.

The coarse carriage locking dog 108 is fitted to one end of the armature of the claw and index solenoid 112 which is mounted on the coarse carriage 84. The other end of the armature is slidingly pinned within a slot at one end of a T shaped link 124 which is also slotted at the head of the T. The width of the slot 125 in the head of the T is equivalent to the width of a card cell 52. A crank shaft 126 of the claw actuator link 114 rides in the head slot 125. Vertical rotational motion of the link 124 results in horizontal rotational motion of the crank shaft 126.

Energization of the claw and index solenoid 112 both moves the coarse carriage locking dog 108 downward and causes the link 124 to pivot, rotating the crank shaft 126.

A two-toothed sector gear 128 (seen from the top in Figures 3 and 4) is affixed to the top of the crank shaft 126 to cooperate with a tab 131 of a claw locking slide 130, which is connected to the pivot point 122 of the claw linkage 120. The claw locking slide 130 is held in a guide member 132 which is fastened to the shuttle 134.

Figure 4:
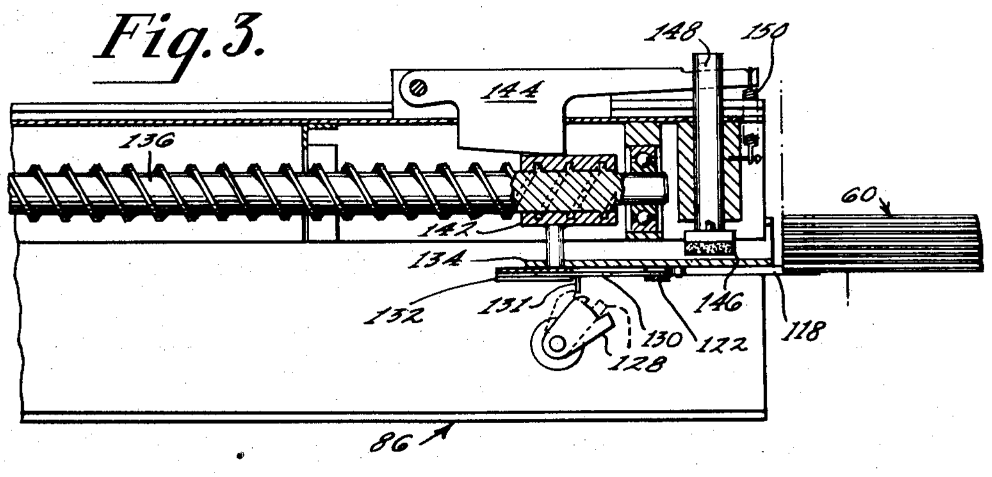
Figure 4 is a top sectional view of the assembly of Figure 3 shown with the shuttle partially advanced and including the magnetic head assembly.

The gear 128 rotates in a counterclockwise direction (as viewed in Figure 4). As may be seen in Figure 2, the pivot point 122 is moved to the left, closing the claws 118 on the notches 68 of a card 60.

When the claw and index solenoid 112 is de-energized, the linkage 114 pivots in a clockwise direction, rotating the crank shaft 126. The sector gear 128 moves the claw locking slide 130 forward which actuates the claw linkage 120 to open the claw 118 releasing the card 60. The teeth of the sector gear 128 are cut so that the gear rotates out of engagement with the locking slide tab 131 after the slide 130 has been moved to the open claw position. The further movement of the locking slide 130 and the shuttle 134 will then not result in an accidental operation of the claws 118.

The shuttle is best described in connection with Figures 2, 3, 4, and 5. A travelling shuttle nut 142 is threaded onto the shuttle shaft 136 and is attached to the shuttle 134. Rotation of the shuttle shaft 136 causes the shuttle nut 142 to travel parallel to the axis of the shuttle shaft 136. A pressure pad cam 144 is engaged by the shuttle nut 142 at its forwardmost position. A pressure pad 146, mounted on a shaft 148, is attached to the pressure pad cam 144. A pressure pad bias spring 150 urges the pressure pad 146 towards engagement with the magnetic head assembly 160. The shuttle nut 142 cams the pressure pad 146 out of contact at the forward limit of shuttle travel.

In Figure 4, the claw assembly 116 mechanism is shown after the shuttle shaft 136 has rotated, moving the shuttle 134 to the left. The claws 118, in engagement with a card 60, have been carried by the shuttle 134 to withdraw the card 60 from the cell 54. The pressure pad cam 144, under the influence of the pad spring 150, forces the pressure pad arm 148 into the plane of card travel to hold the card 60 against the magnetic head assembly 160.

The magnetic head assembly 160, shown in Figure 4, is attached to a head support bracket 156 by a head leaf spring 154 which biases the head assembly 160 toward the shuttle 134. Head alignment screws 158, in cooperation with a stop arm 162 portion of the head support bracket 156, limit the travel of the magnetic head assembly 160 toward the shuttle 134. The alignment screws 158 also control the vertical positioning of the head assembly 160 to assure parallel engagement of the card 60 and the pressure pad 146.

The magnetic head cams 152 on the shuttle 134 (best seen in Figure 2) engage opposing cam surfaces 164 on the magnetic head assembly 160 (see Figure 6) when the shuttle 134 is in position to grip or release a card 60. The magnetic head assembly 160 is thus moved out of the plane card travel against the urging of the head leaf spring 154. As the shuttle 134 moves to the left (as shown in Figure 4), the head assembly 160 moves toward the pressure pad 146.

The shuttle nut 142, at the right hand limit of travel, cams the pressure pad cam 144, the pressure pad arm 148, and the attached pressure pad 146 out of the path of card travel, also leaving a rectangular aperture through which the frame of a card 60 may freely pass. The magnetic head cams 152 on the shuttle 134 engage the opposed and mating head cam surfaces 164.

The inner portions of the cam surfaces 164 (best shown in Figures 5 and 6) are flanged to form tape guides 166. The guides 166 index the tape portion 62 of the card 60 relative to the head assembly 160 to prevent skew or misalignment of the tape 62 during reading or writing. The pole pieces 168 of the individual heads of the magnetic head assembly 160 are stacked in a line between the tape guide members 166 to read or write in parallel message channels of the tape 62.

Figure 5:
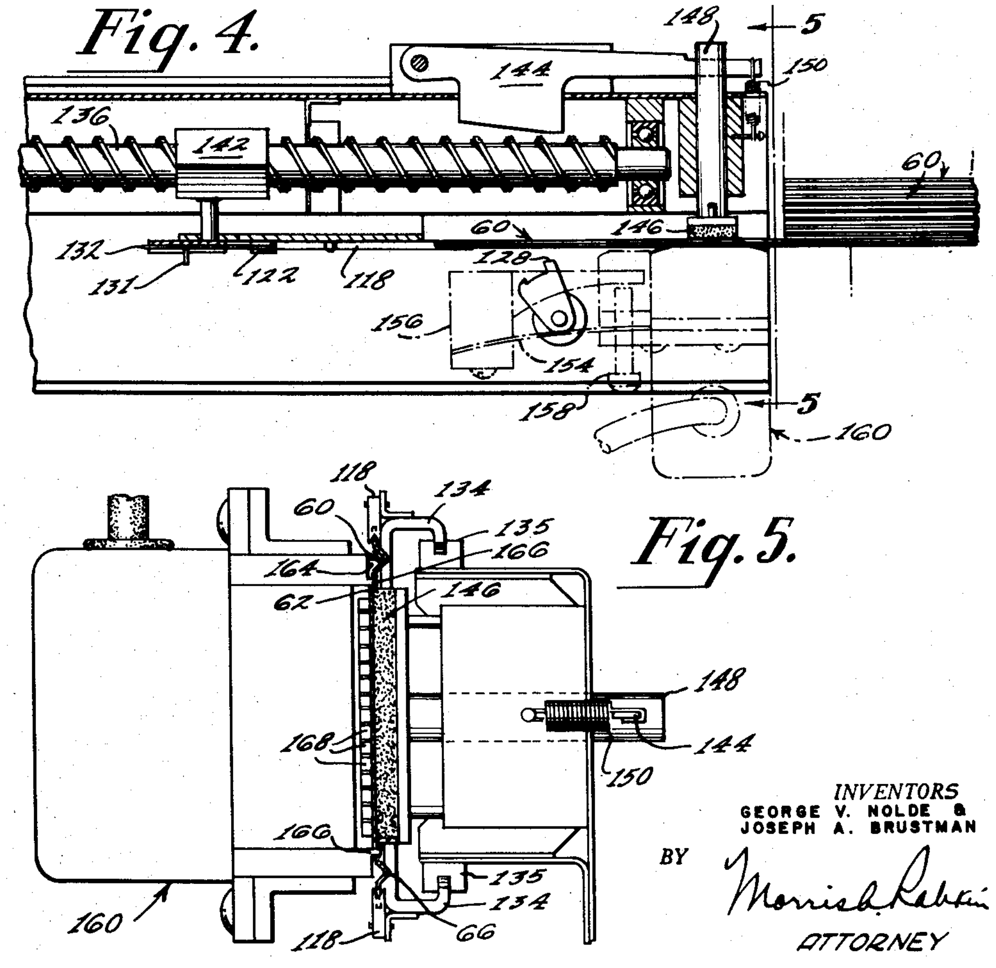
Figure 5 is a view of the apparatus of Figure 4 taken along line 5—5 of Figure 4 in the direction of the appended arrows showing the magnetic head assembly in engagement with a record member.

As illustrated in Figure 5, when a card 60 is engaged by the shuttle 134 and withdrawn from the file, the magnetic head assembly 160 moves toward the card by the head support spring 154. The head is stopped when the head alignment screws 158 contact the stop arm 162 of the head support bracket 156. The pressure pad cam 144, urged by the pressure pad bias spring 150, pushes the pressure pad arm 148 and the attached pressure pad 146 toward the magnetic head assembly 160. The tape portion 62 is held between the pressure pad 146 and the head assembly 160 and is constrained to move in a path limited by the tape guides 166. The pressure pad 146 material yields slightly to provide a cushioning and tensioning of the tape 62 against the head assembly 160.

Figure 7:
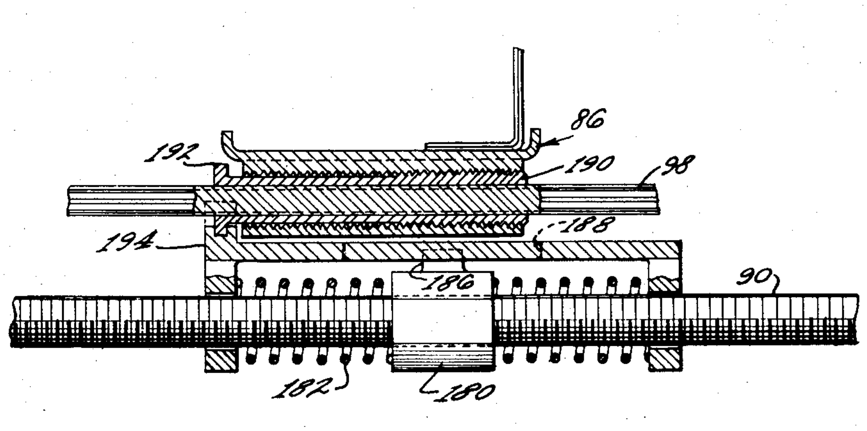
Figure 7 is a detailed sectional view of a portion of the carriage assembly of Figure 2 taken along the line 7—7 of Figure 2 in the direction of the appended arrows.

The coarse and fine carriage drives are illustrated in greater detail in Figure 7. The coarse carriage 84 is transported by a travelling coarse carriage nut 180 mounted on the cell screw shaft 90. The coarse carriage nut 180 moves the coarse carriage 84 by exerting a force on coarse carriage isolating springs 182 and 184 which are coaxially mounted on the cell screw shaft 90. The coarse carriage springs 182, 184 act as a buffer for the coarse carriage 84 and permit the indexing of the coarse carriage 84 by the shuttle locking dog 108 as in Figure 2 above and Figure 8 below. To prevent the coarse carriage nut 180 from rotating with the cell screw shaft 90, a tab 186 projects from the nut 180 and rides within a slot 188 of the coarse carriage 86.

A fine carriage collar 190 is slidingly mounted on the card splined shaft 98 to rotate with the shaft. The fine carriage 86 is threaded onto the collar 190 and rides to the right or left when the card splined shaft 98 and the collar 190 are rotated. An indexing flange 192 seated in a grooved block 194 permits rotation of the collar 190 but locks the fine carrage 86 to the coarse carriage 84. The flange 192 may also prevent overtravel of the fine carriage 86 in one direction. By rotation of the card splined shaft 98, the fine carriage may be aligned opposite any of the cards 60 within a cell 54.

Figure 8:
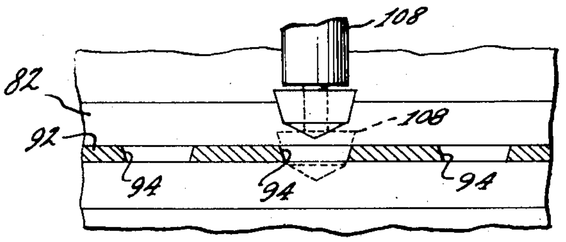
Figure 8 is a detailed view of a portion of the traversing assembly of Figure 2 taken along the line 8—8 of Figure 2 in the direction of the appended arrows.

The coarse carriage locking dog 108 and the coarse indexing notches 94 of Figure 2, are shown in greater detail in Figure 8. Each of the notches 94 is bevelled so that the coarse carriage locking dog 108 may align the coarse carriage 84 accurately. Energization of the claw and index solenoid 112 (seen in Figure 2) moves the coarse carriage locking dog 108 downward, into engagement with one of the coarse indexing notches 94. Should the alignment be faulty, the coarse carriage locking dog 108 moves along the bevel until the notch 94 is fully engaged. The coarse carriage 84 is allowed some movement against the isolating springs 182, 184 of Figure 7. The coarse carriage 84 can then be positioned accurately opposite any addressed cell 54.

Figure 9:
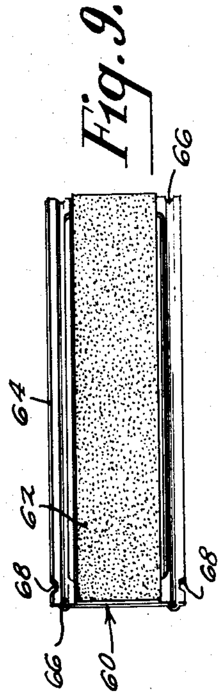
Figure 9 is a side view of a single record member of the arrangement of Figure 1.

An individual record member or card 60 shown in Figure 9, includes a strip of magnetizable tape 62 which is mounted on a frame 64. The frame 64, which is preferably of a structurally rigid metal or plastic, has a rectangular aperture in which the tape 62 is mounted with a slight amount of play. Longitudinal ridges 66 are placed in the frame 64 to provide increased structural rigidity. Notches 68 are cut into the upper and lower edges of the frame 64 for cooperative engagement with the claws 118, of the shuttle assembly 110 of Figure 2.

Figure 10:
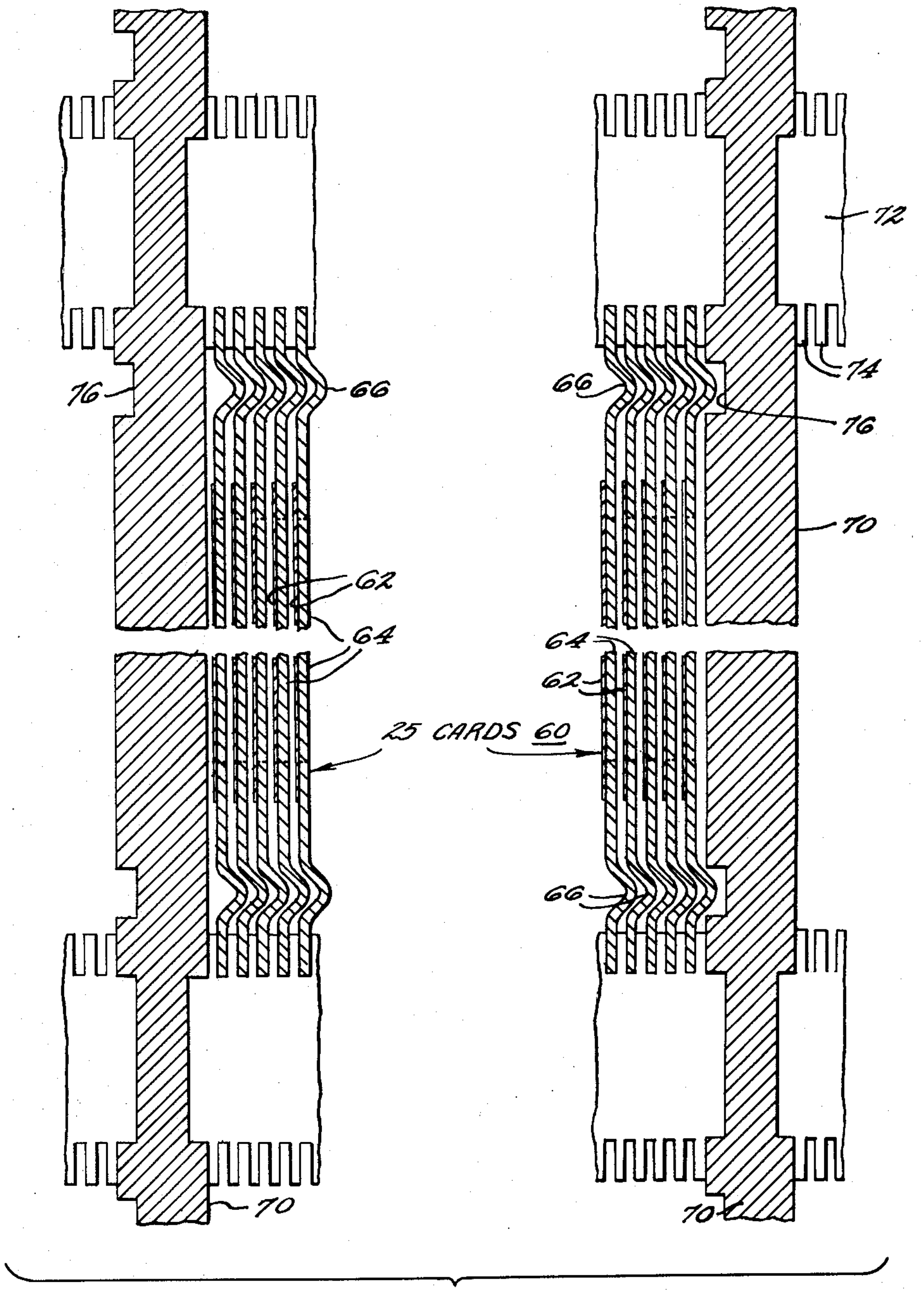
Figure 10 is an end sectional view of a portion of the apparatus of Figure 1.

A portion of the bank carriage assembly 34 is shown in Figure 10. Each cell 54 of a bank 52 is bounded by vertical cell separators 70 and horizontal card guides 72. The card guides 72 contain card spacing teeth 74 which hold the individual cards 60 and maintain the spacing between adjacent cards 60.

The cell separators 70 have upper and lower grooves 76 which permit clearance of card ridges 66. This also helps to prevent incorrect insertion of a card 60 when the file is full, as an inverted card 60 will not fit between adjacent cards 60 or between an end card 60 and the cell separator 70.

Figure 11:
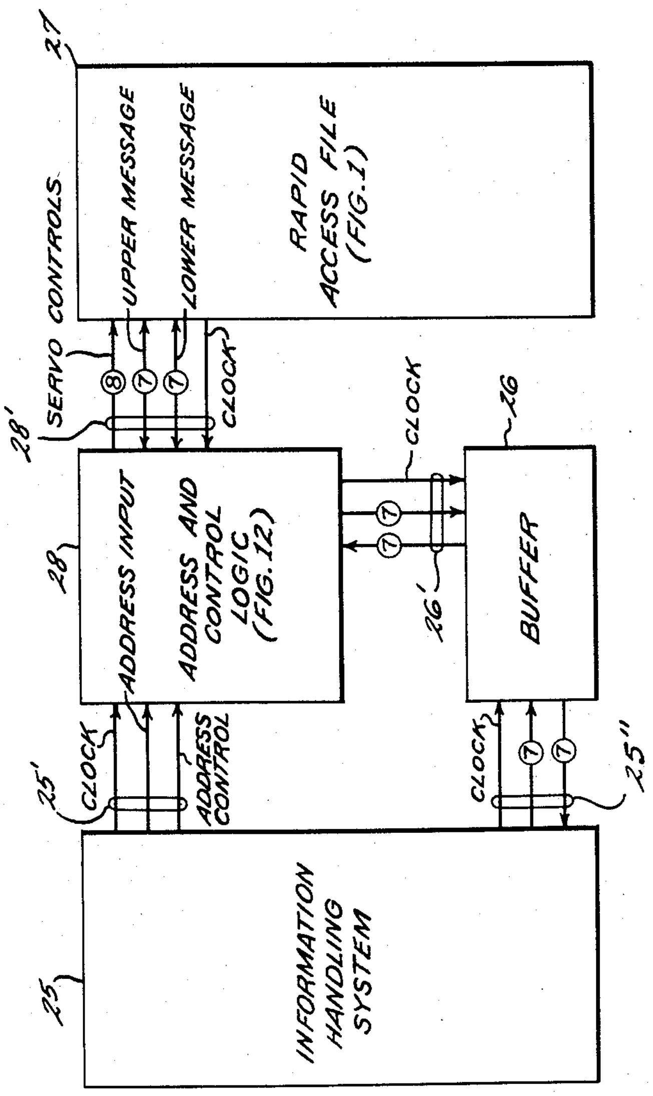
Figure 11 is a block diagram of an information handling system incorporating the present invention.

A system according to the present invention is shown in block form in Figure 11. An information handling system 25 is connected to an apparatus according to the present invention. The information handling system 25 may include computers, special purpose data processing machines or other general purpose data processing machines. All such machines are well known in the art and their purpose and function need not be made a subject of the present disclosure. It is necessary only to state that an information handling system 25 is available to provide certain control signals and message signals.

The rapid access file system for the present invention may be made up generally of interconnected, independent elements, described in terms of function, as a buffer storage 26, a rapid-access file 27, and an address and control logic unit 28. The mechanical features of the rapid-access file 27 have been set forth above in connection with Figures 2 through 16. The address and control logic unit 28 receives information and control signals from the information handling system 25 and provides enabling signals and control signals to the buffer storage 26 and to the file 27.

The buffer storage unit 26 may be any well known, large size, rapid-access storage unit of a commercially available type and may, for instance, be a magnetic drum, a magnetic core matrix, or other high-speed storage. The buffer storage unit 26 connects with the information handling system 25 on multichannel message lines 25'' from the system into the buffer and from the buffer to the system 25. The information handling system 25 provides clock pulses to the buffer 26 for accurate control of the flow of information between the buffer 26 and the system 25.

The buffer 26 connects to the file 27 on several multichannel message lines 26' through the address and control logic unit 28. Message output from the file 27 is provided through lines 28' on one of the multichannel message lines and another of the multichannel message lines is provided to the file 27.

It is desirable that the buffer storage unit 26 be capable not only of storing a message of the desired length, but also that it serve as a speed exchange media to enable information transfer into the buffer storage 26 at a high speed and output at a low speed, or, vice versa.

Figure 12:
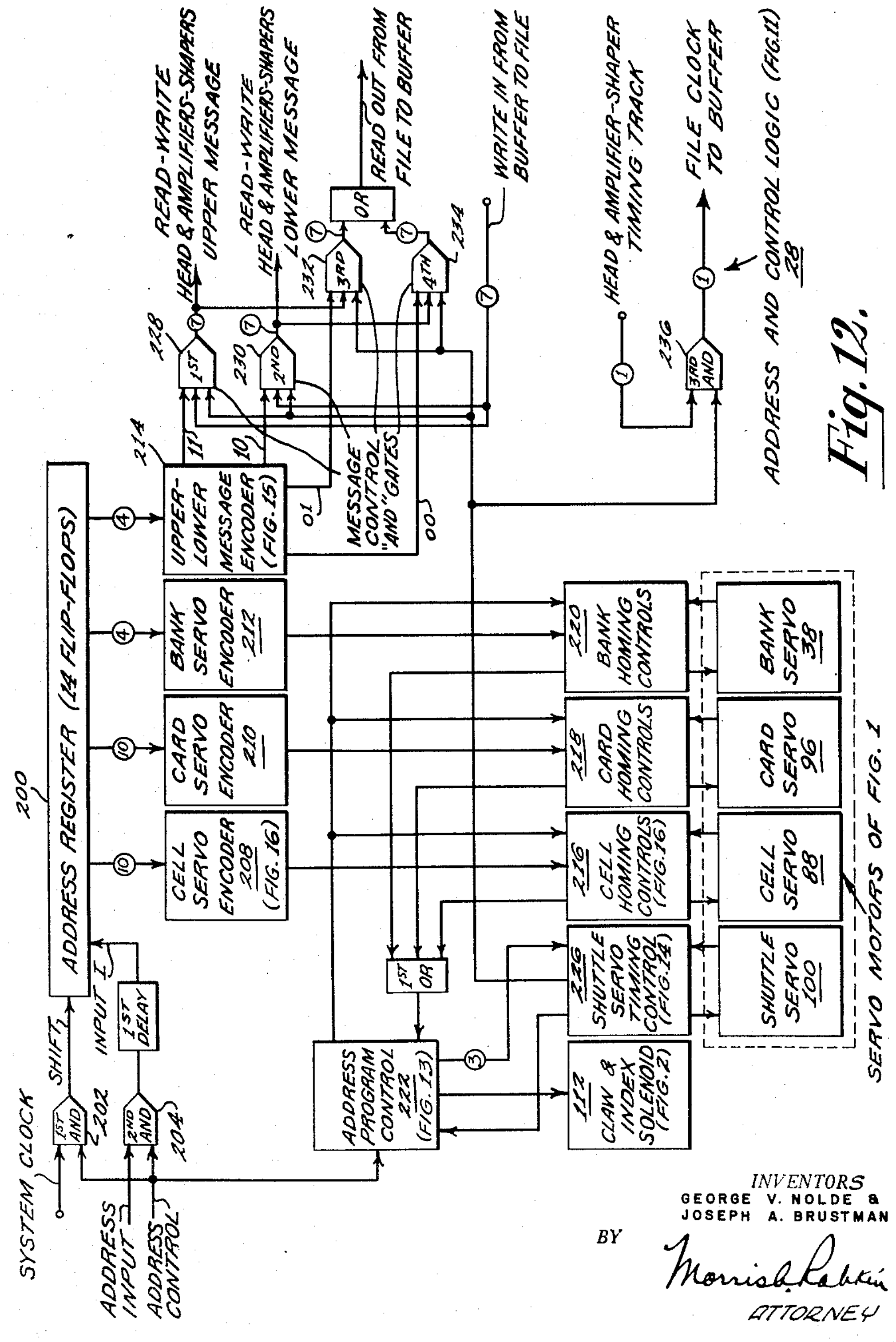
Figure 12 is a block diagram of address and control logic circuits suitable for use in the system of Figure 11.

An address and control logic unit 28 suitable for use with the present invention is shown in block form in Figure 12. A shifting address register 200 is used to store the address corresponding to the physical location of a message within the file. Suitable shifting registers are described at pages 297 and 299 of "High Speed Computing Devices," published by the McGraw-Hill Company, 1950.

The address register 200 has a message input terminal I and a shifting terminal S to which is connected the output of a two-input first "and" gate 202. The first "and" gate 202 has one input connected to the output of a source of clocking pulses for the system (not shown), and the second input connected to a source of address control signals, which is included in the larger information handling system (not shown).

The address control signals are also applied to one input of a two-input second "and" gate 204, whose second input terminal is connected to a source of address input signals. The second "and" gate 204 output is connected to a first delaying means whose output is connected to the input terminal I of the address register 200.

Figure 15:
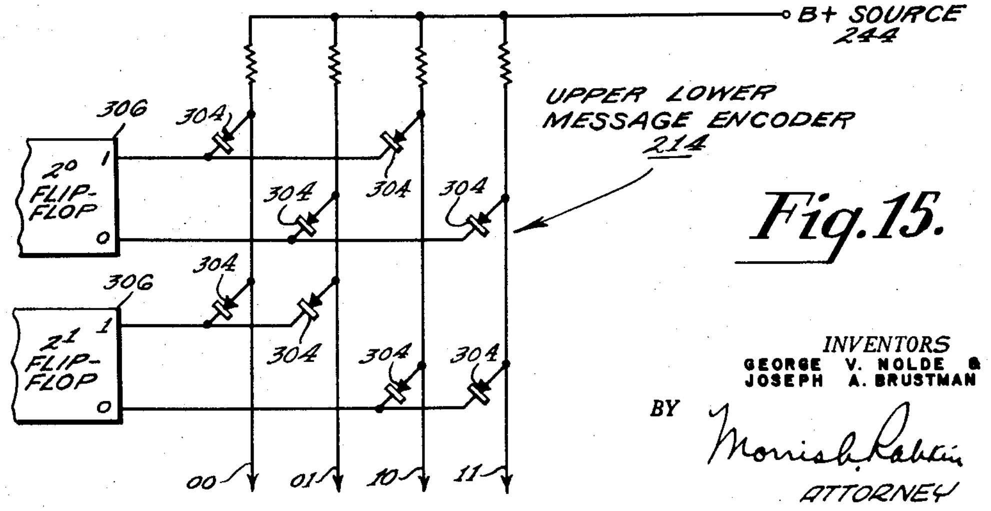
Figure 15 is a diagram of an encoder unit suitable for use in the circuits of Figure 12.

In one embodiment, a shifting address register 200 may include 14 flip-flops connected together in shift register fashion. The "I" and "O" output of each of the flip-flops are applied to separate input terminals of associated digital-to-analogue converters. The 10 output lines of five of the flip-flops may be applied to a "cell-servo" digital-to-analogue encoder 208 as described in greater detail in connection with Figure 35 below. In similar fashion the output lines of the next five flip-flops are applied to the inputs of a "card-servo" digital-to-analogue encoder 210 and the four output lines of the next two flip-flops are applied to the inputs of a "bank-servo" digital-to-analogue encoder 212. The output of the final two flip-flops of the fourteen are applied to the inputs of the "read-write upper-lower message" encoder 214 as shown in Figure 15.

The cell, card, and bank servo digital-to-analogue encoders 208, 210, and 212 may be the conventional digital-to-analogue converter known to the art and particularly described in the patent issued to W. H. Bliss, Patent No. 2,762,862. However, any suitable conversion circuit which provides a voltage output whose magnitude is proportional to the magnitude represented by the quantized input combination may be used.

The outputs of the cell, card, and bank-servo digital-to-analogue encoders 208, 210, and 212 are applied, respectively to the inputs of cell, card, and bank homing control units 216, 218, and 220. The homing control units 216, 218, 220 apply signals to the cell-servo 88, card-servo 96, and bank-servo 38 units, one of which is described in greater detail in connection with Figure 16 below. The homing control units 216, 218, 220 also apply signals to the address program control unit 222, described in more detail in connection with Figure 12 below.

The address program control unit 222 receives control signals from the system (not shown) as well as feedback signals from the homing controls 216, 218, 220. These control signals are applied to a three-input first "or" circuit 224 whose output is connected to the address program control 222.

A shuttle servo timing control unit 226, described below in connection with Figure 14, receives control signals from the address program control 222 and applies other signals to the address program control unit 222 and applies further signals to control the information channels to and from the file. The shuttle servo timing control unit 226 is connected with the shuttle servomotor 100 described above in connection with Figure 1. The claw and index solenoid 112 of Figure 2 is indicated here in block form and is connected to one output of the address program control unit 222.

Each of the four output lines of the upper-lower message encoder 214 is applied to a separate set of message control "and" gates 228, 230, 232, and 234. Each set of message control "and" gates 228, 230, 232, 234 includes a plurality of three-input "and" gates, each connected to communicate with a separate message channel. In one embodiment, a message character may include seven binary digits of information in parallel combination. Accordingly, seven individual three-input "and" gates in parallel combination may be considered a message control "and" gate 228. The four-output lines of the upper-lower message encoder 214 are also applied to the buffer storage 26 of Figure 11 described above.

The multi-channel cable containing a message from a buffer storage is applied to both the first message control "and" gate set 228 and the second message control "and" gate set 230. The output of the first and second message control "and" gate sets 228 are applied to the read-write head amplifiers and shapers of the upper-lower message, respectively, at the data file (not shown). The first message control "and" gate set 228 is enabled by a first output of the upper-lower message encoder 214 and by a control signal from the shuttle servo timing control 226. A second different output of the upper-lower message encoder 214 enables the second set of message control "and" gates 230.

Messages read from a file card 60 are detected at a magnetic head assembly 160 of Figure 1, 6, whose signals are applied to read-write head amplifiers and shapers (not shown). The message signals are applied on the same multi-channel lines that connect the first and second message control "and" gate sets 228, 230 to the amplifiers and shapers. The multi-channel message line from the upper message is applied to a third message control "and" gate set 232, and the multi-channel message line from the lower message amplifier and shaper is applied to the fourth message control "and" gate set 234.

A third output of the upper-lower message encoder 214 enables the third message control "and" gate set 232 and a fourth output similarly enables a fourth message control "and" gate set 234. The shuttle servo timing control unit 226 provides enabling signals to the third and fourth message control "and" gate sets 232, 234. The outputs of the third and fourth message control "and" gate sets are combined in a multi-channel read-out "or" circuit 235 whose multi-channel is applied to the buffer storage 26 of Figure 11. Only one upper-lower message encoder 214 output is provided at any time and, therefore, only one set of the message control "and" gates 228, 230, 232, 234 is enabled at a time.

Each of the file cards 60 of Figure 9 above, is provided with a marking or timing channel in addition to the plurality of message channels, for example, fourteen, seven of which may constitute the upper message channel, and seven of which may constitute the lower message channel. A separate magnetic read-head circuit detects the pulses in the timing channel and, therefore, may provide clocking signals to the circuit. These clocking signals are detected on a signal line and applied to a two-input third "and" gate 236 whose output is applied to the buffer storage 26 for timing purposes. The second enabling input to the third "and" gate 236 is applied by the shuttle servo timing control 226 output. The timing control 226 output also enables the message control "and" gate sets 228, 230, 232, and 234 during withdrawal of a card 60 and disables these gates for the return portion of the cycle as described in greater detail in connection with Figure 20, below.

Figure 13:
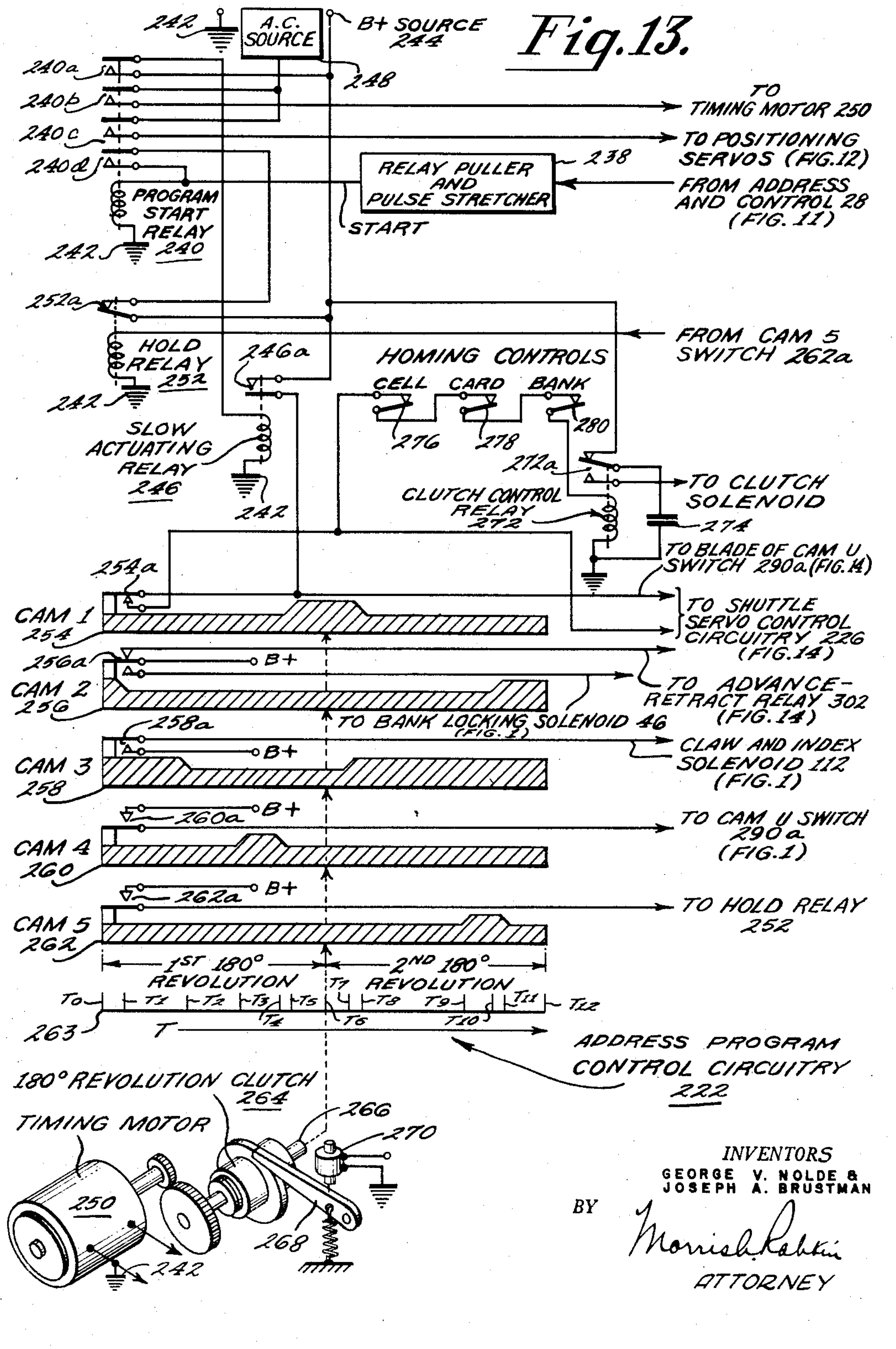
Figure 13 is a diagram of address program control circuitry suitable for use in the circuits of Figure 12.

An address program control unit which may be used in the circuits of Figure 12 is shown in idealized schematic form in Figure 13. An incoming start signal is applied to a pulse stretcher and power amplifier 238. A pulse stretcher circuit may be any known trigger circuit which provides an output of relatively long duration in response to a relatively short input triggering pulse. The pulse stretcher 238 output connects to one terminal of a program start relay winding 240, which is returned to a common reference potential indicated by the conventional ground symbol 242.

The program start relay winding 240 controls four switch contacts, 240$a$, 240$b$, 240$c$, and 240$d$. The "$a$" relay switch 240$a$, when closed, connects a source of B+ voltage 244 to the input of a slow-actuating relay winding 246 which controls one set of switch contacts 240$a$. The "$b$" switch contacts 240$b$, when closed, connect a source of A.C. power 248 to the power input terminal of a timing motor 250.

The "$c$" switch contacts 240$c$, when closed, connect the source of A.C. power 248 to the positioning servos of Figures 12 (above) and 16 (below). The "$d$" switch contacts 240$d$, when closed, provide a holding circuit connecting the program start relay winding 240 to the source of B+ supply 244 through the normally closed switch contacts 252$a$ of a hold relay winding 252. The hold relay winding 252 is energized by a signal from a cam switch, described below in greater detail, which signal occurs at the end of an operational cycle.

A set of five program cams designated, for convenience, cam (1) 254, cam (2) 256, cam (3) 258, cam (4) 260, and cam (5) 262, are mounted on a cam shaft 266 which is coupled to the timing motor 250 output through a one-half revolution or integral revolution clutch 264. The clutch 264 is held by a clutch detent arm 268 which is controlled by a clutch solenoid 270.

The clutch control solenoid 270 is connected to one terminal of a clutch control relay switch 272$a$, which responds to a clutch control relay winding 272. The switch 272$a$ has two possible states. In the normal arrangement, the B+ power source 244 is connected through a clutch control capacitor 274 to ground 242. In an alternative configuration, assumed when the clutch control relay winding 272 is energized, the circuit connects the clutch solenoid 270 through the capacitor 274 to ground 242.

A set of three relay control switches 276, 278, 280 each controlled respectively, by a relay winding 216, 218, 220 in the cell, card, and bank homing controls respectively, are series connected. The combination is connected to the source of B+ supply 244 through the slow actuating relay switch 246$a$ and the normally closed cam 1 switch 254$a$. The cell, card, and bank switches 276, 278, 280 are held open whenever the respective homing control unit is positioning the associated servo and an error signal exists. The slow relay winding 246 is energized after the servos have been energized, and the cell, card, and bank relay switches 276, 278, 280 have opened. When all three servos have been properly positioned, all switches 276, 278, 280 close and complete a circuit to the clutch control relay winding 272.

The program cam profiles are shown aligned with a time base 263 which may represent a timing diagram of an operational cycle, indicating the relative times at which the respective switches operate. The cam surfaces move from right to left during a revolution of the cams.

The cam 1 switch 254$a$ connects the B+ source 244 to the homing control relay switches 276, 278, 280, and to the shuttle servo control circuit 226, more fully described below in connection with Figure 13.

The cam 2 switch contacts 256$a$ in one of two positions, completes a circuit between the source of B+ power 244 and an advance-retract relay winding in the shuttle servo timing control 226, described more fully below in connection with Figure 20. In the other position, the B+ source 244 is connected to the bank locking solenoid 46.

The initially open cam 3 switch contacts 258$a$ when closed, complete a circuit between the B+ source 244 and the claw and index solenoid 112 of Figures 1 and 2 above. The initially open cam 4 switch contacts 260$a$ when closed, complete a circuit between the B+ source 244 and the shuttle servo timing control circuits 226. The initially open cam 5 switch contacts 262$a$, when closed, complete a circuit between the B+ source 244 and the hold relay winding 252. The hold relay winding 252, when energized, opens relay switch 252$a$, de-energizing the program start relay 242 which halts the cycle of operation.

Figure 14:
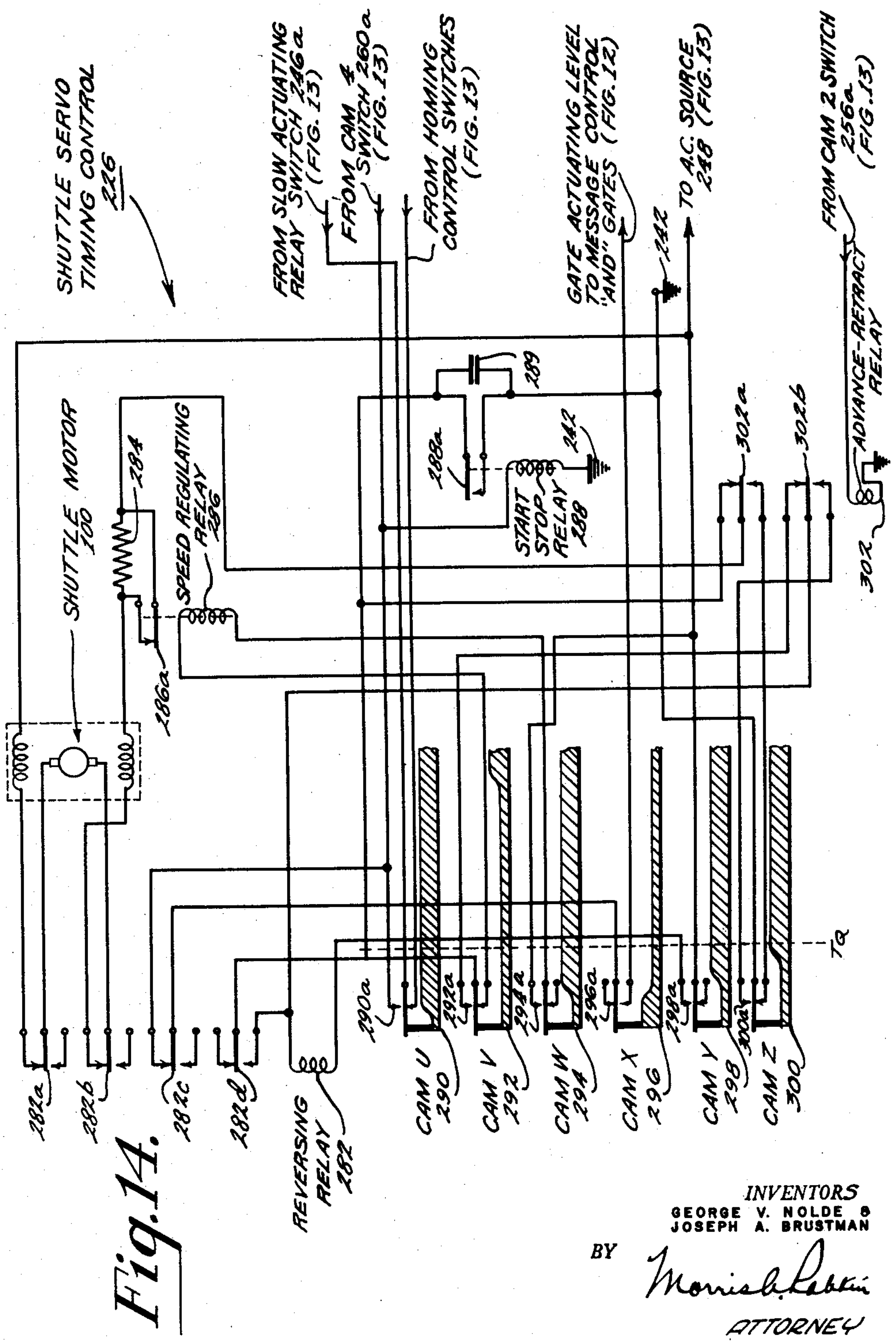
Figure 14 is a diagram of a shuttle servo timing control unit suitable for use in the circuits of Figure 12.

Figure 14 is a diagram of a shuttle servo timing control circuit which may be used in the circuits of Figure 12. The profile of each of a set of six program cams is shown on a line which may represent an operational timing diagram. These cams are coupled to the shuttle servo motor 100 of Figure 1 through a reduction gear train and complete less than one revolution during a complete shuttle traversal. The cam switches control the shuttle operation in response to cam operation.

A reversing relay 282 controls four single pole double throw switches 282$a$, 282$b$, 282$c$, 282$d$. In one position, switches 282$a$ and 282$b$ connect the shuttle motor 100 for drive in one, or the forward direction. When the reversing relay winding 282 is energized, the switches assume their second position and the shuttle motor is connected to drive in the opposite or reverse direction. A speed regulating resistor 284 is placed in the circuit of the field winding of the shuttle motor 100 and is shunted by a circuit through the normally closed switch contacts 286$a$ of a speed regulating relay winding 286.

A start-stop relay winding 288 is connected from ground 242 to the B+ source through the cam 4 switch contact 260$a$ of the address program control unit 222 of Figures 12, 13 above. The start-stop relay winding 288 is also connected to the upper contact of a cam U switch 290$a$. The blade of the cam U switch 290$a$ is connected to the source of B+ supply 244 through the closed slow actuating relay switch 246$a$ (in Figure 13 above). An arc suppressor capacitor 289 is connected in parallel with the start-stop relay contacts 288$a$.

The set of six program cams, cam U–290, cam V–292, cam W–294, cam X–296, cam Y–298, and cam Z–300, are shown as they would be with the shuttle 134 at the right hand limit of travel, as viewed in Figure 2. A quiescent start position, with the shuttle 134 partially advanced, is indicated by the dotted line $T_Q$. Each cam moves a switch blade into one of two switch positions.

An advance-retract relay winding 302 is energized through a connection to the cam 2 switch contacts 256$a$ of the address program control circuit 222 of Figure 13. The advance-retract relay winding 302 controls two, two-position switches 302$a$, 302$b$. The switch contacts 302$a$ complete a circuit between the speed regulating resistor 284 and the ground 242 through the start-stop relay switch contacts 288$a$, and the switch 302$b$ completes a circuit between one terminal of the reversing relay winding 282 and the open pole of the cam V switch contact 292$a$ when the advance-retract relay winding 302 is de-energized. In the alternative configuration, the switch contact 302$a$ connects the speed regulating resistor 284 to the blade of the cam Z switch 300, which, at the position shown, completes a circuit to ground 242 and the switch contact 302$b$ completes a circuit between the open pole of the cam Z contact 300$a$ and the reversing relay winding 282.

At the quiescent start position, the shuttle 134 is partially advanced. The cam U switch 290$a$ connects the cam 1 switch 254$a$ output line 504 to the cam 4 switch 260$a$ output line 502. The cam V switch contact 292$a$ connects the speed regulating relay winding 286 to ground 242 through the start-stop switch contacts 288$a$. The cam W switch contacts 294$a$ connects the speed regulating relay winding 286 to the source of A.C. power 248. The cam X switch contacts 296$a$ connect the blade of reversing relay switch 282$c$ to the enabling inputs of the message control "and" gate sets 228, 230, 232, 234, and the third "and" gate 236 of Figure 18. The cam Y switch 298*a* connects the source of A.C. power 248 to the reversing relay winding 282. The cam Z switch 300*a* at the quiescent point, connects the lower contact of the advance-retract relay switch 302*b* to the common ground 242.

In the alternative configurations of the cam switches, the U switch 290*a*, provides a shunt path between the contacts of the cam 1 switch 254*a* of Figure 13. Cam V switch 292*a* connects the upper contact of the advance-retract relay switch 302*b* to the common ground 242 through the closed start-stop relay 288*a*. The cam W switch contact 294*a* connects the speed regulating relay winding 286 to the source of A.C. power 248. The cam X switch 296*a* opens the circuit from the blade of reversing relay switch contact 282*c* to remove the gate-enabling level from the circuits of Figure 12. Cam Y switch 298*a* connects the source of A.C. power 248 to an open terminal. The cam Z switch 300*a* connects the lower contact of the advance-retrace relay switch 302*a* to the common ground 242.

Figure 15 is a schematic of a matrix encoder suitable for use in the circuits of Figure 12. A source of B+ power 244 is connected to four output lines. Four input lines are provided. Each input line is connected through diodes 304 to two of the output lines so that each combination of the first or second and third or fourth input line uniquely selects one output line. The first and second input lines can be connected respectively, to the (1) and (0) output terminals of a first flip-flop 306 and the third and fourth input line can be connected respectively, to the (1) and (0) output terminals of a second flip-flop 306. Each binary combination of the two digit positions is represented on a separate output line. In one embodiment, the digital number 00 represents "read lower message," 01 represents "read upper message," 10 represents "write lower message," and 11 represents "write upper message." These control signals are applied to the appropriate message control "and" gate sets of Figure 12.

Figure 16:
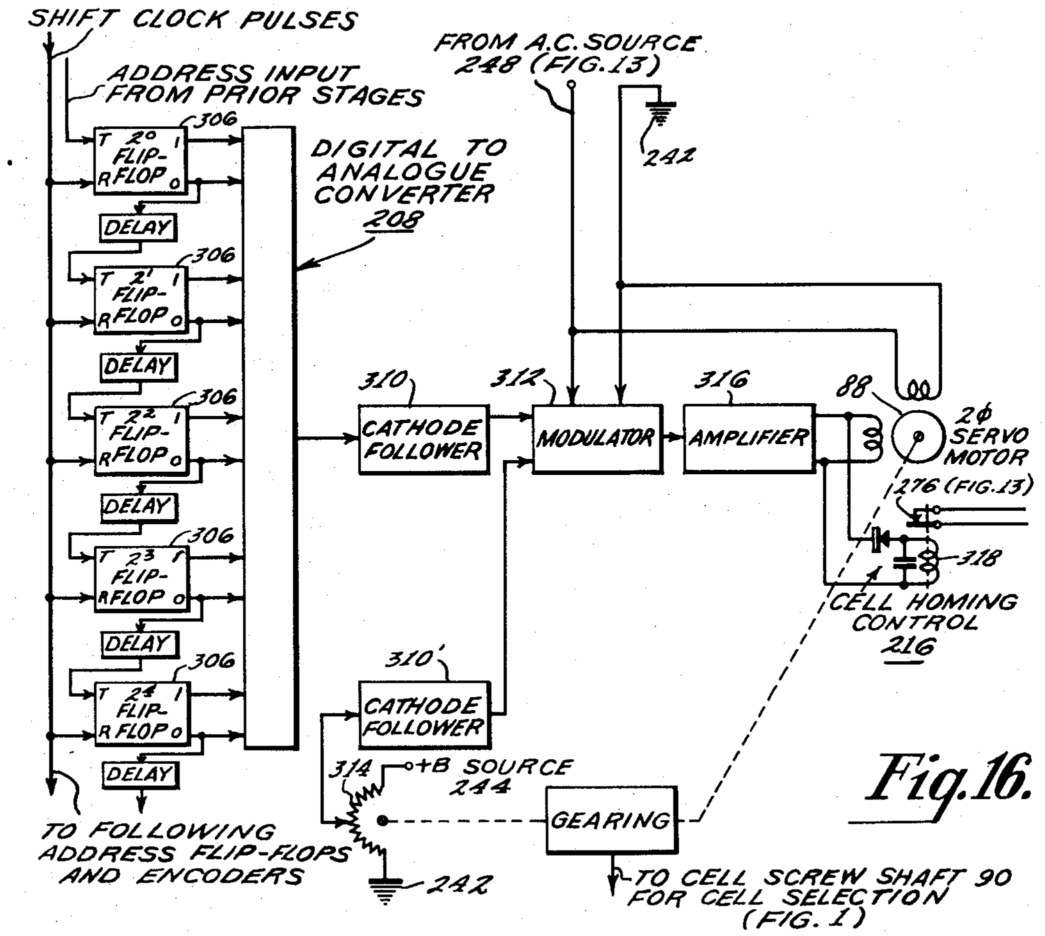
Figure 16 is a block diagram of a cell selection servo of Figure 12.

A portion of the address register 200 of Figure 12 is illustrated in Figure 16 and is shown connected to a digital-to-analogue converter 208, which is, in this instance, coupled to a cell homing control 216 and the associated cell servo motor 88. A set of flip-flops 306, interconnected in shifting register fashion, may be used as the address register 200. Signal input is applied to the trigger terminal T of a first flip-flop 306. Shift pulses are applied to the reset terminals R. The 0 or reset output of each flip-flop 306 is applied through a delaying circuit 308 to the trigger terminal T of the next stage flip-flop 306.

In one address stage, for example, five flip-flops 306 are used in the cell address portion of the address register 200. A binary combination of output signals is applied to the digital-to-analogue converter 208 and converted to a voltage, the magnitude of which is representative of the binary number. The voltage signal is applied to a servo motor network with a feedback error control which provides a unique physical positioning for any given input voltage signal. Other signal responsive positioning combinations are possible, as for instance, an analogue-to-digital shaft encoder whose output could be compared directly with the digital address signals.

In the embodiment shown, the output of the digital-to-analogue converter 208 is applied to a cathode follower 310, the output of which is applied to one input of a modulator circuit 312. A gear train attached to the output shaft of the servo motor 88 is connected to a potentiometer circuit 314, which generates voltage output representative of the angular position of the servo motor. With the gearing train, the signal may represent the number of revolutions of the motor 88. The output of the potentiometer 314 is applied to a second cathode follower circuit 310′ whose output is applied to a second input of the modulator circuit 312.

One input winding of the servo motor 88 is connected to ground 242 and to the source of A.C. power 248 through the program start relay switch contact 240*c* of Figure 13. The power and ground leads are also applied to the modulator circuit 312. The modulator 312 generates an error signal from the voltage difference between the outputs of the cathode followers 310, 310′. A phase difference, proportional to magnitude and direction of the voltage difference is derived and applied to an amplifier 316 connected to the second input of the two phase servo motor 88. The output of the amplifier 316 is sampled and applied to a homing control relay winding 318, which is in parallel with a filter capacitor 320. A diode 322 rectifies the current through the relay winding 318 which controls the homing switch 276 of Figure 13 above.

Figure 17:
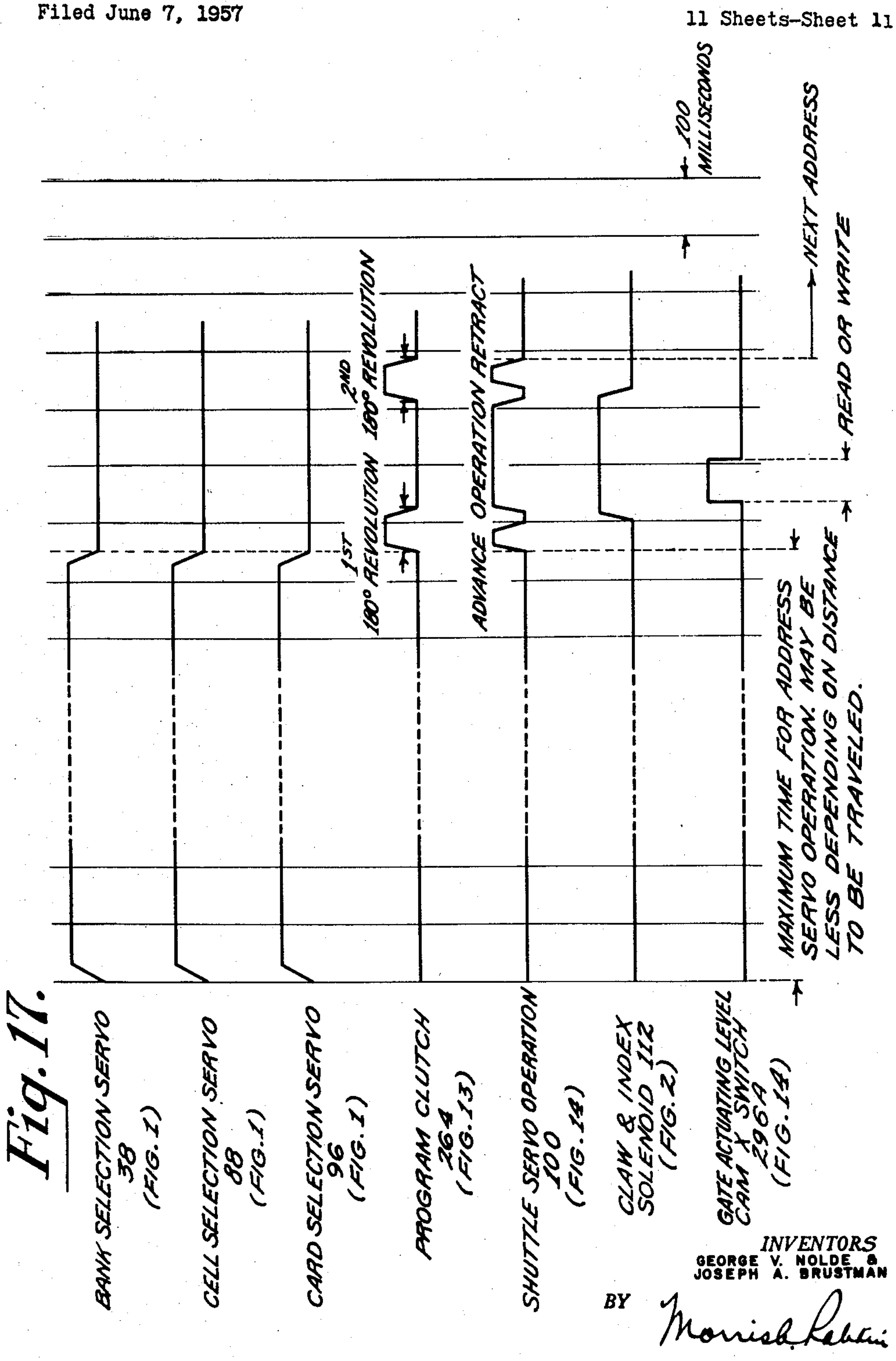
Figure 17 is a timing diagram of an addressing operation carried out by the arrangement of the figures.

A timing diagram of an addressing operation is illustrated in Figure 17. The time intervals are measured along the horizontal axis and each separate operating element is indicated on a separate line. The energization of any of these elements is indicated by a deflection on the vertical axis.

For ease in reader understanding, the individual graphs will not be discussed separately, but rather an addressing operation will be outlined with reference to all of hte graphs and figures. At time $T_o$, the address is placed in the address register 200 and output is applied to the digital-to-analogue encoders 208 of Figure 12 above. Power is applied to the positioning servos after energization of the program start relay 240 of Figure 13 above and the closing of program start relay switch 240*c*.

The bank, cell, and card motors operate until no error signal is produced within the servo control of Figure 16 above and the individual homing control relay windings are de-energized. When all three servos have been stopped, and the three homing switches 276, 278, 280 have closed, the program clutch 264 is actuated and goes through a first half revolution.

As the program cams revolve, the shuttle motor 100 moves the shuttle 134 from the quiescent position to the proper position for engaging a card and stops. The claw 118 and shuttle locking dog 108 are operated and the program clutch 264 is held. The shuttle motor 100 then operates in the forward direction, withdrawing one card 60 from the file. As the shuttle comes up to speed, the read-write gates 228 to 236 are enabled for transmission of messages.

When the shuttle 134 reaches the end of its advance cycle, the motion is reversed and the card 60 is replaced in the file. When the shuttle servo 100 has returned the card fully, the program clutch is again energized and the second 180 degree revolution begins. The locking dog 108 is withdrawn and the claws 118 are opened. The shuttle servo 100 is again energized and advances the shuttle 134 to the quiescent position at which time the entire system assumes a quiescent state.

In normal operation, the file system of the present invention is at a rest or quiescent condition whenever not actively processing a message, with the shuttle 134 positioned at the latest address location.

A data processing operation, which may either be insertion of a message into the file or extraction of a message from the file, is initiated by a series of signals from the information handling system 25. In order to gate the address signals into the address register 200 of Figure 12, the first and second "and" gates are enabled by a signal from the address control output of the system 25 of Figure 11. The address control enabling level is also applied to the relay puller pulse stretcher 238 of Figure 13 to become the start signal.

A binary digital address is serially applied to the second "and" gate 204 from the system 25 and after a delay, to the input terminal I. Each address digit is shifted into the register 200 by the system clock whose clock signals are applied to the shift terminal of the address register 200 through the first "and" gate 202. In the preferred embodiment, a 14 digit address is used which includes location information as well as an indication whether the message is to be read or written into the file.

When the entire address has been shifted into the register 200, the individual servo digital-to-analogue encoders operate to provide signals to the various homing control units 216, 218, 220. If, for instance, the binary number 10101 has been applied to the cell servo digital-to-analogue encoder 208, the encoder 208 will provide a voltage signal. The decimal equivalent of the binary number 10101 is 21 and accordingly the voltage output of the encoder 208 will be 21 times a given basic voltage quantum.

Referring now to Figures 12 and 14, the application of the address control signal triggers the pulse stretcher 238 energizing the winding 240 program start relay. The switch contacts **240*a*, 240*b*, 240*c*, 240*d*, close, providing a circuit from the source of A.C. power 248 to the homing control and servo units of Figures 12 and 16 and to the timing motor 250. The power is applied to the servo motors 38, 88, 96 and the modulators 312 compare voltages from the encoders 208, 210, 212 to voltages provided by potentiometers 314. The modulators derive error signals which provide phase differences in the windings of the servo motors 38, 88, 96**, energizing the motors.

Program start relay contacts **240*a* close completing a circuit between the B+ power source 244 and a slow actuating relay winding 246. The slow actuating relay 246** operates in a relatively long time, permitting each of the encoders to energize the respective servo motors.

With reference to Figure 16, as soon as a difference signal is provided by the modulator 312 and amplifier 316, the homing control relay windings 318 are energized, and the homing switches 276, 278, 280 are held open as long as the servo motors 38, 88, 96 are operating. The slow actuating relay 246 operates after all the homing control relays have been energized and one or more of the homing switches 276, 278, 280 open. The slow actuating relay switch **246*a* completes a circuit from the B+ source 244 through the cam 1 switch contact 254*a* to the homing switches 276, 278, 280**.

The slow actuating relay 246 also completes a circuit from the B+ source 244 to the shuttle servo timing control unit 226 of Figures 12 and 14. In the quiescent state, the shuttle 134 is in a partially advanced position so as not to interfere with the positioning of the carriages during addressing.

A source of B+ power 244 is supplied through the cam 2 switch **256*a* to energize the advance-retract relay winding 302. In the energized condition, switch 302*a* connects the shuttle motor 100 to an open terminal at the cam Z switch 300*a*. The reversing relay winding 282 is energized by a circuit from the source of A.C. 248 through the cam Y switch 298*a*, the advance-retract relay switch 302*b*, and the closed cam Z switch 300*a* configuration to ground 242. Once energized, the reversing relay winding 282 provides its own latching circuit through switch contacts 282*d***.

Cam 1 switch contact **254*a* of Figure 13 provides a circuit from the B+ source 244 to the blade of the cam U switch 290*a*. The start-stop relay 288 is energized through the cam U switch 290*a*, closing the start-stop switch 288*a* completing the holding circuit for the reversing relay 282 through switch 282*d*. The speed regulating relay 286 is energized through a circuit including the cam W switch contact 294*a*, the cam V switch contact 292*a*, and the start-stop relay switch 288*a* to ground 242**.

The cell servo, card servo, and bank servo, 38, 88, 96 operate simultaneously. In Figure 1, the bank servo 38 drives the pinion 40 and rack 42, raising and lowering the banks 52 to the proper address position. Each bank 52 may be said to contain a set of record cells 54. The cell servo 88 drives the coarse carriage 84 linearly to a position opposite the desired cell 54, which is a subset of the set of the selected bank 52, while the card servo 96 linearly moves the fine carriage 86 to a position opposite a particular card 60 within a cell 54.

The cell servo motor 88 drives threaded cell screw shaft 90 (as shown in Figures 2 and 7) which passes through a coarse carriage nut 180 which is kept from rotating by a tab 186 held in a slot 188 of the coarse carriage 84. As the cell screw shaft 90 rotates, the coarse carriage nut 180 travels to the right or left, carrying the coarse carriage 84 with it. The card position is selected with the fine carriage adjustment. The card splined shaft 98 rides in a threaded fine carriage collar 190. Rotation of the splined shaft 98 and collar 190 engages threads in the fine carriage 86 moving to the right or left.

After each of the servos 38, 88, 96 has reached the addressed position, the error signals produced by the modulators 312 of Figure 16 cease and the homing control relays 318 de-energize, permitting closure of the cell, card, and bank homing switches 276, 278, 280 at time $T_0$. When the last of these switches closes, the clutch control relay 272 of Figure 13 is energized and the clutch control capacitor 274 pulses the clutch solenoid 270 through the clutch control switch **272*a*. The clutch control detent 268 releases the clutch 264 and couples the timing motor 250 to the program shaft 266** for one-half of a revolution.

As the program control shaft 266 starts its revolution, the cam 2 switch contacts **256*a* change position at time $T_1$, energizing bank locking solenoid 46 of Figure 1 and de-energizing the advance-retract relay 302 of Figure 14. The bank locking dogs 48 of Figure 1 engage the bank indexing notches 44, aligning the selected bank 52 with the shuttle assembly 110. The advance-retract relay switches 302*a*, 302*b* change to their other configurations and a circuit is closed from the source of A.C. supply 248 through the shuttle motor 100 to the advance-retract relay switch 302*a* and the closed start-stop relay switch 288*a* to ground 242. The shuttle motor 100 turns in a direction, which, for convenience, may be termed the reverse direction inasmuch as the reversing relay 282** has been energized.

With reference to Figures 1–4, the shuttle motor 100 drives a shuttle splined shaft 102. The splined shaft 102 passes through the shuttle assembly 110 and drives a beveled gear 140 which is slidingly mounted on the spline shaft 102. A mating beveled gear 138 at right angles to the driving beveled gear 140 is connected to a threaded shuttle shaft 136 mounted on the fine carriage 86. A shuttle nut 142 is mounted on the shuttle shaft 136 and engages the movable shuttle 134. Rotation of the threaded shuttle shaft 136 drives the shuttle nut 142 and the shuttle 134 to the left and right as viewed in Figures 2 and 5.

As the shuttle 100 reverses, the cam Z switch **300*a* switches a ground connection from advance-retract relay switch 302*b* to relay switch 302*a*. Cam Y switch 298*a* disconnects the A.C. power source 248 from the reversing relay 282. The reversing relay 282 de-energizes changing the configuration of reversing relay contact switches to a 282*a*, 282*b*, 282*c*, 282*d*, and energizing the shuttle motor 100 in an opposite direction. A circuit is completed from the source of B+ supply 244 in Figure 13 through the lead of the cam 1 switch 254*a* and into the cam U switch blade 290*a* through the closed reversing relay switch contacts 282c and the closed cam X switch contacts 296*a***.

A gate actuating level is provided which is immediately disconnected by further motion of the control cams and operation of the cam switches. The cam X switch **296*a* disconnects the gate actuating line from the source of B+ supply 244. The W cam switch 294*a* disconnects the speed regulating relay winding 286 from the source of A.C. power 248. The speed regulating relay contact switch 286***a* opens which inserts the speed regulating resistance 284 into the motor circuit 100. The cam U contact switch 290*a* is energized opening the circuit from the source of B+ 244 to the start-stop relay 288 which opens the start-stop relay switch 288*a* thereby disconnecting the shuttle motor 100 from ground 242. The shuttle motor 100 stops with the shuttle at its position nearest the card cell 54 as shown, for example, in Figures 1, 2, and 3.

The timing motor 250 of Figure 13 continues to revolve and, at time $T_2$, the cam 3 switch 258*a* closes, energizing the claw and index solenoid 112.

Referring to Figures 2 and 8, the coarse carriage locking dog 103 is advanced into engagement with a coarse indexing notch 94. The linkage 114 is pivoted in a counterclockwise direction, pulling the crank shaft 126 to the left. Rotation of the crank shaft 126 rotates the sector gear 128 which engages the tab 131 to move the claw locking slide 130 to the left. The claw linkage 120 is straightened, engaging the claws 118 in the notches 68 of a card 60.

At time $T_3$, cam 4 switch contact 260*a* operates, energizing a line connected to the start-stop relay winding 288 of Figure 14. The closed start-stop relay switch 288*a* completes a circuit from shuttle motor 100 to ground 242, and the shuttle motor 100 starts, driving the shuttle spline shaft 102 of Figures 2–5. The shuttle screw shaft 136 is rotated and the shuttle 134 pulls a card 60 from the file.

When the shuttle nut 142 moves to the left (Figures 1–5), the pressure pad cam 144 is released and the pressure pad 146 moves into engagement with a record card 60. At the same time, the head cam 164 (shown in Figure 6) is released by the shuttle cam 152 (see Figure 2) as the shuttle 134 moves to the left, permitting the magnetic head 160 to move into engagement with the card 60 under the influence of leaf spring 154 to a pre-set position determined by the head alignment screws 158.

As the shuttle motor 100 starts, the shuttle program cams operate their respective switches. The cam U contact switch 209*a* operates connecting the start-stop relay winding 288 to the source of B+ potential 244 of Figure 13. At time $T_4$ the cam 4 contact switch 260*a* opens which disconnects that circuit from the start-stop relay winding 288 of Figure 14. At time $T_5$ the cam 1 contact switch 254*a* opens de-energizing the clutch control relay winding 272, and clutch control relay switch 272*a* changes configuration to charge the clutch control capacitor 274 from the source of B+ 244. At time $T_6$ the clutch control detent 268 engages the one-half revolution clutch 264 holding it against further revolution and the cam shaft 266 ceases its rotation.

As the shuttle motor 100 of Figure 14 accelerates, a cam X switch 296*a* is actuated which connects the message control "and" gates 228, 230, 232, 234, to a source of enabling potential through reversing relay switch 282*c* and the closed switch contacts of the U cam switch 290*a* to the source of B+ potential 244 at Figure 13 connected through the slow actuating relay switch 246*a*. The enabling level at the message control "and" gates 228, 230, 232, 234, permits a message to be written into or read from the file card 60 passing between the transducing head assembly 160 and the pressure pad 146.

The message characters appear under the control of the timing track on the card which synchronizes the output at the third "and" gate 236 which is also enabled by the enabling output of the cam X contact switch 296*a*.

The cam W switch 294 operates, energizing the speed regulating relay 286. The speed regulating resistor 284 is inserted into the motor circuit to maintain the motor speed constant.

The cam Y switch 298*a* operates, connecting the AC power source 248 to the reversing relay winding 282. The reversing relay is not energized until cam V switch 764 operates to provide a complete circuit to ground 242. The cam Z switch 300*a* operates next, connecting the common ground 242 to the open side of the advance-retract relay switch 302*b*.

Assuming, for example, that during the present operation a message is to be written from a file card upper message channel into the buffer register 26 from a card 60, the clock channel pulses are detected from the respective heads and are gated through the third "and" gate 236 to control the file clock at the buffer storage 26. The individual characters are detected at all of the read-write heads, and amplifier and shaper circuits (not shown) and signals appear in the circuits, Figure 12, at the upper-lower message control "and" gate sets 232 and 234. The upper-lower encoder 214 provides a signal on the 01 output line to enable the third message control "and" gate set 232 and the signals are applied to the message control "or" circuit 236. The individual characters of a message are thus clocked into the buffer 26.

When the entire message has been read and the shuttle 134 nears the limit of its travel, the cam V switch 292*a* is actuated which energizes the reversing relay winding 282 and de-energizes the speed regulating relay 284, thereby shunting the regulating resistor 284 out of the shuttle motor circuit, and allowing full voltage to be applied for the braking operating. As the reversing relay 282 is energized, the reversing relay switch contacts 282*c* open, removing the gate enabling level from the cam X switch contact 296*a*.

The shuttle motor 100 slows and reverses, coming up to speed in the reverse direction. Cam V switch 292*a* again operates to energize the speed regulating relay 286. The motor 100 runs at a steady speed, replacing the card 60 in the cell 54. The cam Z switch 300*a* operates with no immediate effect on the circuit, connecting the open side of the advance-retract switch 306*a* to ground 242. The cam Y switch 298*a* operates, disconnecting the reversing relay 282. The polarities of the connections to the shuttle motor 100 are reversed for positive braking. Cam W switch 294*a* operates to de-energize the speed regulating relay 286 applying full voltage for braking.

The cam X switch 296*a* is actuated which disconnects the gate actuating lines from the reversing relay switch contact 282*c*. The cam U switch 290*a* is next actuated and the start-stop relay 288 is de-energized, opening the power circuit to the shuttle motor 100. A circuit is completed between the source of B+ 244 in Figure 13 through the cam switch 240*a* back through the homing switches 276, 278, 280 to energize the clutch control relay 272. The clutch control solenoid 270 pulls the detent 268 and enables the program shaft 266 to complete the second 180 degree revolution. At time $T_7$, the cam 3 switch 258*a* opens to release the claw and index solenoid 112. The link 124 of Figures 1 and 2 pivots in a clockwise direction, turning the crank shaft 126 and the sector gear 128 to the right, opening the claws 118. At time $T_8$, the cam 1 contact switch 254*a* closes but has no effect other than to shunt out the cam U switch contacts 290*a* of the shuttle servo timing control circuit 226 of Figure 14.

At $T_9$ the cam 5 switch 262*a* is closed, energizing the hold relay 252 which opens the latching circuit 252*a* of the program start relay 240. Program start relay contacts 240*a*, 240*b*, 240*c*, 240*d* are opened, disconnecting the sources of power 244, 248 from the circuit. The clutch control capacitor is connected to recharge from the B+ source 244. The power to the timing motor 250 is cut off but the inertia of the motor continues the rotation of the program control cam shaft 266 until the one revolution clutch 264 is engaged by the detent 268. At time $T_{10}$ cam 2 contact switch 256*a* closes, de-energizing the bank solenoid 46 and connecting a source of power 244 to energize the advance-retract relay 506 of Figure 14. The connections of the advance-retract relay switches 302*a*, 302*b*, are changed, and the shuttle motor 100 circuit is returned to ground 242 through the cam Z contact switch 300a and the advance-retract relay switch 302a.

At time $T_{11}$ the cam 5 contact switch 262a opens de-energizing the hold relay 252 to permit closure of the hold relay switch 252a preparing the circuits for the next cycle. The timing motor stops of its own inertia and the address program control circuitry 222 remains quiescent.

The shuttle motor 100 operates, and the cam U contact switch 290a is actuated to energize the start-stop relay 288 from the B+ source 244 of Figure 13 which is connected through the slow actuating relay contacts 246a. Because of the slow actuation the switch remains closed for a sufficiently long time to complete the return of the shuttle 134 to the quiescent position. Energizing the start-stop relay winding 288 closes the start-stop relay switch 288a. The cam W contact switch 294 is actuated energizing the speed regulating relay 286.

At the actuation of cam Z contact switch 300a the shuttle motor circuit 100 is disconnected from the ground 242 and the shuttle motor 100 coasts to a stop with the shuttle 134 at the quiescent start point. Actuation of the cam Z switch contact 300a also energizes the reversing relay 282. A circuit connects the source of A.C. 248 through the cam Y contact switch 298a to the relay winding 282, and returns through the advance-retract relay switch 302b and the cam Z switch contact 300a to ground 242. At this point the gate actuating level is disconnected through opening of the reversing relay switch contacts 282c.

The system is now quiescent and a new address instruction may be inserted for either the writing or reading of messages in the file. For a writing operation, the energization of the system would proceed as described above with the additional requirement that the buffer storage 26 be loaded from the system 25 while the file servo motors are searching for the new location. However, this may be easily accomplished since known buffer storage may be loaded at a ten kilocycle rate which, for example, may take only 5.12 milliseconds for a 512 character message. This interval is substantially less than the time required for the actuation of the servo motors and the positioning of the carriages.

When the proper location is reached and the selected card 60 is withdrawn from the file, the contents of the buffer storage 26 are written onto the card 60 under the control of the clock channel of the card 60. When a message is extracted from the file, the contents of the buffer storage 26 may be read into the system 25 under control of the system clock. Reading into the system 25 could be accomplished in the same time needed to load information into the buffer 26 from the system 25.

For the transfer of information out of the file, the operating sequence proceeds as above except that other control circuits are energized to select the proper combination of message "and" gates to transfer the information in the desired direction. In the addressing control logic circuits of Figure 12, to read a message from the file, multi-channel input is taken from the read-write head amplifiers-shapers of the card 100, and each message may be applied respectively to the third set of output "and" gates 285 and the fourth set of output "and" gates 286. However, the upper-lower message encoder 214 provides an enabling signal to only one of these, and the enabled set of gates is connected to the buffer register input "and" gates 536.

Thus, there has been disclosed a novel rapid access file which may store a relatively large amount of information that may be retrieved or added to at a relatively rapid rate. The access to the file is of the so-called "random" type in that any message location in the file may be reached directly, unlike "ordered" storage devices which successively address each location. The file is not truly "random" in that the access time to any message depends in part on the location of the message last processed.

It is possible that the size and shape of the file may be modified. The illustrated mechanism may, for example, be rotated through 90° so that cards are withdrawn vertically and all positioning motions are in a horizontal plane.

What is claimed is:

1. Apparatus for filing a plurality of messages comprising means adapted to receive a plurality of record units, each of said units being adapted to have a given number of said messages recorded thereon for filing, said record receiving means comprising rack means for supporting said record units in stacked arrays, first signal responsive means for moving said stacked arrays along a first linear path; second signal responsive means for selecting any one of said record units in said array for recording or reproducing messages thereon comprising transducing means movable during the movement of said stacked arrays along a path transverse to said first linear path; and mechanism adapted to be coupled to any one of said record units in said stacked array for selecting the one of said record units disposed at the intersection of said transverse linear paths.

2. Apparatus for the storage of a plurality of information items and for the selection of one of said stored information items comprising means for supporting a plurality of discrete information storage devices, a first means responsive to first address electrical signals for moving said supporting means to a first location corresponding to said first address signals, message transfer means for converting said information items into a form for storage in said devices and for extracting stored information items from said devices, a second means responsive to second address electrical signals for moving said message transfer means during the movement of said supporting means to a second location corresponding to said second address signals, and handling means responsive to signals from said first and second means for selecting from said supporting means the one of said information storage devices which is located at the address corresponding to said first and second address signals and which is disposed opposite said message transfer means after the operation of said first and second means.

3. Apparatus for filing a plurality of messages and for the selection of any one of said filed messages comprising means adapted to support a plurality of discrete information storage units, a first means responsive to first address electrical signals for moving said supporting means to position a predetermined one of said discrete information storage units at a corresponding first location, means for communicating with said information storage units to read and write said messages, a second means responsive to second address electrical signals for moving said communicating means to a second location corresponding to said second address signals, and means responsive to said first and second means for engaging the selected one of said information storage units located opposite said positioned communicating means, said selected information storage unit being located within said supporting means at an address common to said first and second locations and corresponding to said address electrical signals.

4. An information storage device comprising a plurality of individual record members for storage of signals representing information messages, record member storage means having a plurality of addressable locations, each for the storage of one of said record members, said record storage means being linearly movable in a first dimension, carriage means adjacent said storage means, transport means for linearly moving said carriage means in a second dimension transverse to said first dimension, record retrieval means mounted on said carriage means for engaging a record member, said retrieval means being linearly movable in a direction transverse to both said first and second dimensions, a transducing member mounted on said carriage means adjacent said retrieval means for transferring information to and from record members when engaged by said retrieval means, and addressing means responsive to address signals for moving said record storage means in said first dimension and said carriage means in said second dimension to position said retrieval means opposite the record member at the location corresponding to the address signalled.

5. Apparatus for filing a plurality of messages and for selecting any of said filed messages comprising a first means for the storage of an array of record units, said units individually being adapted to store a given number of said messages for filing, a second means cooperating with any one of said record units for reproducing any one of said recorded messages, said first and second means being movable with respect to each other, signal responsive means for positioning said first and second means to select a predetermined one of said record units, said positioning means comprising (1) means for moving said first means into a first selection station whereby said second means is positioned to select record units disposed in a sub-area of said array, said predetermined record unit being included in said sub-area, and (2) means for moving said second means into a second selection station whereby said second means is positioned to select those of said record units in a smaller section of said sub-area, and means adapted to be coupled to any one of said record units for selecting said predetermined record unit, said predetermined record unit being located at the location common to both said first and second stations.

6. An information storage device for the storage and retrieval of messages stored on individual record members comprising support means to hold said individual record members, each at an addressable location, said support means being linearly movable in a first dimension, a first carriage linearly movable in a second dimension transverse to said first dimension, a second carriage mounted on said first carriage and linearly movable in said second dimension with respect to said first carriage, record transport means mounted on said second carriage and linearly movable in a third dimension transverse to said first and second dimensions, said record transport means including record engaging means, transducing means mounted on said second carriage adjacent said record engaging means for transmitting messages to and from record members engaged by said record engaging means, first signal responsive means for moving said support means a predetermined distance corresponding to a first address signal to align a first set of said record members opposite said carriage means, said first set including a desired record member, second signal responsive means for moving said first carriage a predetermined distance corresponding to a second address signal to align said first carriage opposite a subset of said first set of record members, and a third signal responsive means for moving said second carriage a predetermined distance corresponding to a third address signal to position said record engaging means opposite said desired record member, said desired record member being stored at the location corresponding to said first, second, and third address signals.

7. The invention of claim 6 including a fourth signal responsive means for moving said record transport means into operative engagement with said desired record member for energizing said record engaging means, and for further moving said record transport means, said record engaging means, and said desired record into operative engagement with said transducing means.

8. The invention of claim 7 above wherein said fourth signal responsive means responds to a signal from first, second, and third means after said desired distances have been traversed.

9. In combination, a record member for storage of information represented by signals, said record member having a planar rectangular shape, and means to engage said record member including signal responsive claw means to grasp a record member, shuttle means connected to said claw means to transport said claw means along a straight line path in the plane of said record member, and transducing means adjacent said shuttle means for cooperation with said record member to transmit information signals to and from a grasped record member as said member is transported by said claw and shuttle means along said straight line path.

10. In combination, a plurality of individual record members for storing information, said record members being arranged in groups; support means for holding said members; a first movable member movable along a path adjacent said record members; a second movable member mounted on, and movable along said path relative to, said first movable member; record transport means mounted on said second movable member; means for extracting a desired one of said record members including (1) means for moving said first movable member to a first position adjacent that one of said groups containinng the desired record member, and (2) means for simultaneously moving said second movable member relative to said first movable member to a second position, said desired record member being located at the location common to both said first and said second positions.

References Cited in the file of this patent

UNITED STATES PATENTS

| | | |
|---|---|---|
| 2,013,012 | Tauschek | Sept. 3, 1935 |
| 2,080,100 | Tauschek | May 11, 1937 |
| 2,521,929 | Mercau | Mar. 28, 1939 |
| 2,553,003 | Popoff | May 15, 1951 |

OTHER REFERENCES

Publication: Juke Box Uses, Electronics, October 1955, pages 138–143.

UNITED STATES PATENT OFFICE

CERTIFICATE OF CORRECTION

Patent No. 2,918,656 December 22, 1959

George V. Noldeet al.

It is hereby certified that error appears in the printed specification of the above numbered patent requiring correction and that the said Letters Patent should read as corrected below.

Column 2, line 10, for "storge" read -- storage --; column 5, line 66, for "carirage" read -- carriage --; column 9, line 11, for "240a" read -- 246a --.

Signed and sealed this 21st day of June 1960.

(SEAL)

Attest:

KARL H. AXLINE

Attesting Officer

ROBERT C. WATSON

Commissioner of Patents